United States Patent [19]
Shon

[11] Patent Number: 5,499,238
[45] Date of Patent: Mar. 12, 1996

[54] ASYNCHRONOUS TRANSFER MODE (ATM) MULTIPLEXING PROCESS DEVICE AND METHOD OF THE BROADBAND INTEGRATED SERVICE DIGITAL NETWORK SUBSCRIBER ACCESS APPARATUS

[75] Inventor: Seung W. Shon, Daejeon, Rep. of Korea

[73] Assignees: Electronics and Telecommunications Research Institute, Daejeon; Korea Telecommunication Authroity, Seoul, both of Rep. of Korea

[21] Appl. No.: 336,650

[22] Filed: Nov. 4, 1994

[30] Foreign Application Priority Data

Nov. 6, 1993 [KR] Rep. of Korea .................. 1993-23534

[51] Int. Cl.[6] ................................................. H04Q 11/04
[52] U.S. Cl. .................... 370/60.1; 370/61; 370/85.6; 370/94.2; 370/112; 340/825.5
[58] Field of Search .................................. 370/60.1, 58.1, 370/58.2, 61, 58.3, 53, 94.1, 60, 85.6, 94.2, 112; 340/825.5, 835.51, 835.52

[56] References Cited

U.S. PATENT DOCUMENTS 5,301,055  4/1994  Bagchi et al. ...................... 370/60.1
5,301,184  4/1994  Uriu et al. .............................. 370/94.1

*Primary Examiner*—Alpus Hsu
*Assistant Examiner*—Ricky Ngo
*Attorney, Agent, or Firm*—Spencer & Frank

[57] ABSTRACT

An asynchronous transfer mode (ATM) multiplexing process device and a method for processing a broadband integrated service digital network subscriber access apparatus. The device is equipped with input buffering means for storing the input cell momentarily, cell identification means classifying the input cell data per QOS class, QOS class buffering means storing the cells per class, scheduling control means controlling the scheduling order, scheduling means outputting the cells to the outside in the scheduling order and connection state management means connecting the network operator and the ATM multiplexing process device. The method includes a first step of determining if a buffer is full after classifying the cells, a second step of outputting the cells after granting priority if the buffer is full and a third step of outputting the cells in the class order if the buffer is not full. A device and method is thereby provided which can be applied to an embodiment of the transmission device requiring statistic cell multiplexing. It can be utilized for a broadband integrated service digital network requiring high speed.

3 Claims, 8 Drawing Sheets

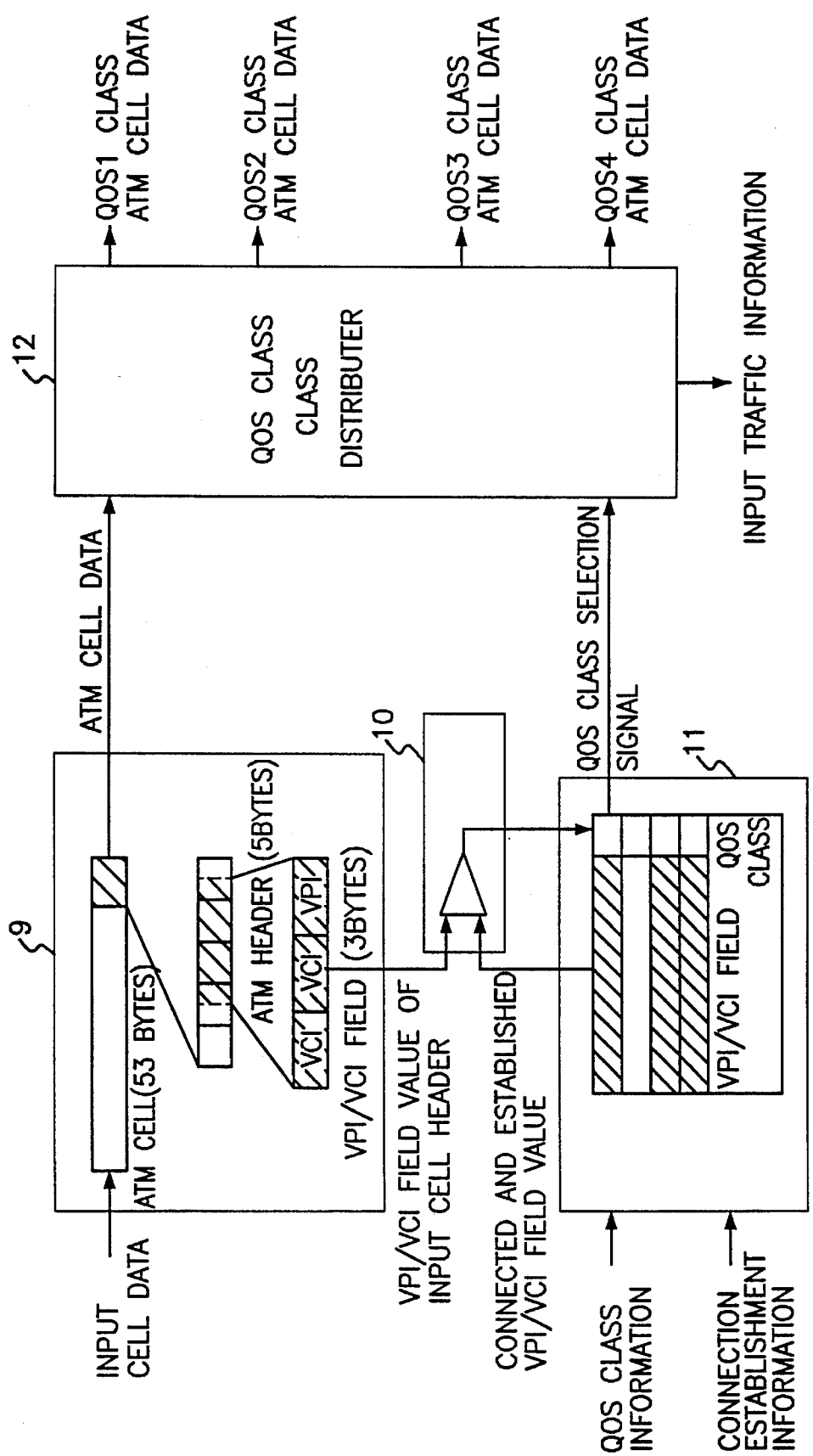

ASYNCHRONOUS TRANSFER MODE (ATM) MULTIPLEXING PROCESS DEVICE AND METHOD OF THE BROADBAND INTEGRATED SERVICE DIGITAL NETWORK SUBSCRIBER ACCESS APPARATUS

BACKGROUND OF THE INVENTION

1. Field of the Invention

This invention relates to an Asynchronous Transfer Mode (ATM) multiplexing process device and a method for processing an ATM multiplexing of a broadband integrated service digital network (B-ISDN, subscriber access apparatus. The broadband subscriber access apparatus constituting a broadband access network in the B-ISDN multiplexes the ATM (Asynchronous Transfer Mode) cells per line and per virtual connection input through the standard interface, abiding by the quality of service agreed to at the time of the connection establishment by granting an extra value in accordance with the buffer (FIFO) state used at each input terminal, the QOS (Quality of Service) class of the input service traffic following the connection, the differential threshold process according to this QOS class and the management viewpoint of the network operator.

2. Description of the Prior Art

The necessity for a subscriber access network is being raised and a subscriber access apparatus with the various topologies as the required device is being researched, in order to own the resources such as the bandwidth of the line jointly in an efficient way, manage the telecommunications network appropriately in accordance with the subscriber characteristics and control the capabilities of the multimedia service, the broadcasting and distribution service support, the multiple connection and the multiple-way communications efficiently when the service with the various traffic characteristics such as the audio, video and data service in B-ISDN is interfaced with the network.

The multiplexing process is essential to the access apparatus with the concentrated architecture in order to accommodate these complicated requirements and own the resources efficiently. This requires the designing of the ATM multiplexing process device equipped in the B-ISDN subscriber access apparatus of the STM-1 (Synchronous Transfer Mode-1) class which accommodates the service requirement of the subscriber and allows the operator to manage the network efficiently.

The design of the multiplexing process device is very important in the system design for the B-ISDN, because there are difficulties in basically providing the quality of service agreed to at the time the connection is established under the B-ISDN circumstances of the various transmission characteristics such as the variable bit rate and burstness. The performance of the multiplexing process device influences the performance of the entire telecommunications system as well as the performance of the subscriber access apparatus especially, though various kinds of ATM multiplexers using the statistical technique have been proposed currently.

FIG. 1A and 1B are a configuration diagram of the conventional ATM multiplexing process devices.

FIG. 1A shows an ATM multiplexing process device employing the scheduling algorithm of a polling method, which concentrates the ATM cells inputting through each input buffer at one output line sequentially with a use of a scheduler part by being equipped with multiple(N) input buffers, a scheduling controller and a scheduler part.

A connection state management part performs a function in sending connection establishment information instructing the operations following each connection to the scheduling controller after receiving its input from a signal process part, and performs a transfer of the buffer state information input from the scheduling controller to the signal process part.

This is a method of multiplexing while observing only the level of each input buffer regardless of the subscriber QOS requirements, which operates in a way to exclude the empty buffer sequentially from the scheduling order and pass the output order over to the next buffer. Therefore, there has been a problem with bandwidth being wasted.

FIG. 1B shows an ATM multiplexing process device employing the scheduling algorithm of a weighted round robin method, equipped with multiple (N) input buffers, a VPI/VCI (Virtual Path Identifier/Virtual Channel Identifier), a buffer of each VPI/VCI, the scheduler part, the scheduling controller, the connection state management part and the signal process part, which operates in a way to store the respective cell in the separate buffer according to the VPI/VCI which first of all, allocate the extra value in accordance with the relative ratio of the bandwidth agreed to for each VPI/VCI at the time of the connection establishment subsequently and grant the additional output opportunity as much as the extra value to the order sequentially operating.

Therefore, there has been a problem that only the bandwidth among the QOS parameters is considered, and not the cell loss ratio and the cell delay influencing the QOS enormously.

SUMMARY OF THE INVENTION

This invention is devised in order to solve the problems for the above conventional technology and is intended to provide an ATM multiplexing process device and a method for processing an ATM multiplexing of an B-ISDN subscriber access apparatus, which is set to have the architecture of the easy access reflecting the added value of the network operator in order to divide the traffic class into 4 steps in accordance with the level of the QOS after grasping the requirements such as the cell loss ratio and the cell delay so as to multiplex the ATM cells according to the QOS which each service has, abide by the QOS requirements of each subscriber by controlling in the priority method accordingly and provide the resources which the network has efficiently and equally from the viewpoint of the network management.

The configuration of the device constituting this invention in order to accomplish the above purpose is characterized by being equipped with (a) input buffering means for storing cells inputting each input terminal through a plurality of input lines momentarily; (b) cell identification means for classifying input cell data to a predetermined QOS(Quality of Service) class in accordance with connection establishment information, QOS class information and a header information of the input cell data after receiving the input cell data from said input buffering means, and outputting ATM cell data and input traffic Information; (c) QOS class buffering means for storing the ATM cell data input from said cell identification means, respectively, according to the class, and for outputting buffer state information; (d) scheduling control means for outputting scheduling order information, the connection establishment information and QOS class information to said cell identification means, and for outputting all operation information of the ATM multiplexing process device and input traffic information, after receiving the input traffic information from said cell identification means, the buffer state information from said QOS class buffering means, and a QOS parameter; (e) scheduling means for outputting the cells input from said QOS class buffering means to the outside in accordance with scheduling order information input from said scheduling control means; and (f) connection state management means for outputting the QOS parameter to said scheduling control means in accordance with a connection state information and the extra value of the network operator , and for transferring all the operation informations of the ATM multiplexing process device and the input traffic information to the network operator after receiving them from said scheduling control means.

The multiplexing method constituting this invention which is applied to the above configuration is characterized by including (a) a first step for determining whether there is any QOS class buffer of 'buffer full', after classifying cells to be transmitted according as the QOS class and storing the cells; (b) a second step for outputting the cells in a buffer of the 1st priority according to the FIFO principle until the number of served cells becomes the same as the threshold after making the buffer of 'buffer full', if any, the buffer of the 1st priority by granting the priority to the QOS class buffer, and then for outputting all cells in a buffer of subsequent priority according to the FIFO principle for all buffers sequentially if there is a cell; and (c) a third step for outputting all the cells in a predetermined buffer of the 1st priority according to the FIFO principle if there is no QOS class buffer of 'buffer full', and then for outputting all cells in the QOS class buffer of the subsequent priority according to the FIFO principle sequentially, and then for outputting all cells for all QOS class buffers.

Therefore, the ATM multiplexing process device in accordance with this invention operates to output the cells with the higher priority first according to the FIFO (First-In-First-Out) principle in this order by storing the various traffic per line and per connection input to the subscriber access apparatus in the independent buffer after dividing into 4 priorities (Please refer to FIG. 3) and making the order information of the cells to be output according to the service class information related to the input cells and the priority of the network manager's request.

The design is made to output the cells as much as the threshold after granting the highest priority to the input traffic whose buffer is full in order to prevent the increase of the cell loss ratio occurring due to the low priority.

BRIEF DESCRIPTION OF THE DRAWINGS

Other objects and aspects of the invention will become apparent from the following description of embodiments with reference to the accompanying drawings in which;

FIG. 3A and 3B is a conceptional diagram to describe the operation of the cell identification part.

DETAILED DESCRIPTION OF THE INVENTION

Figure 1A:
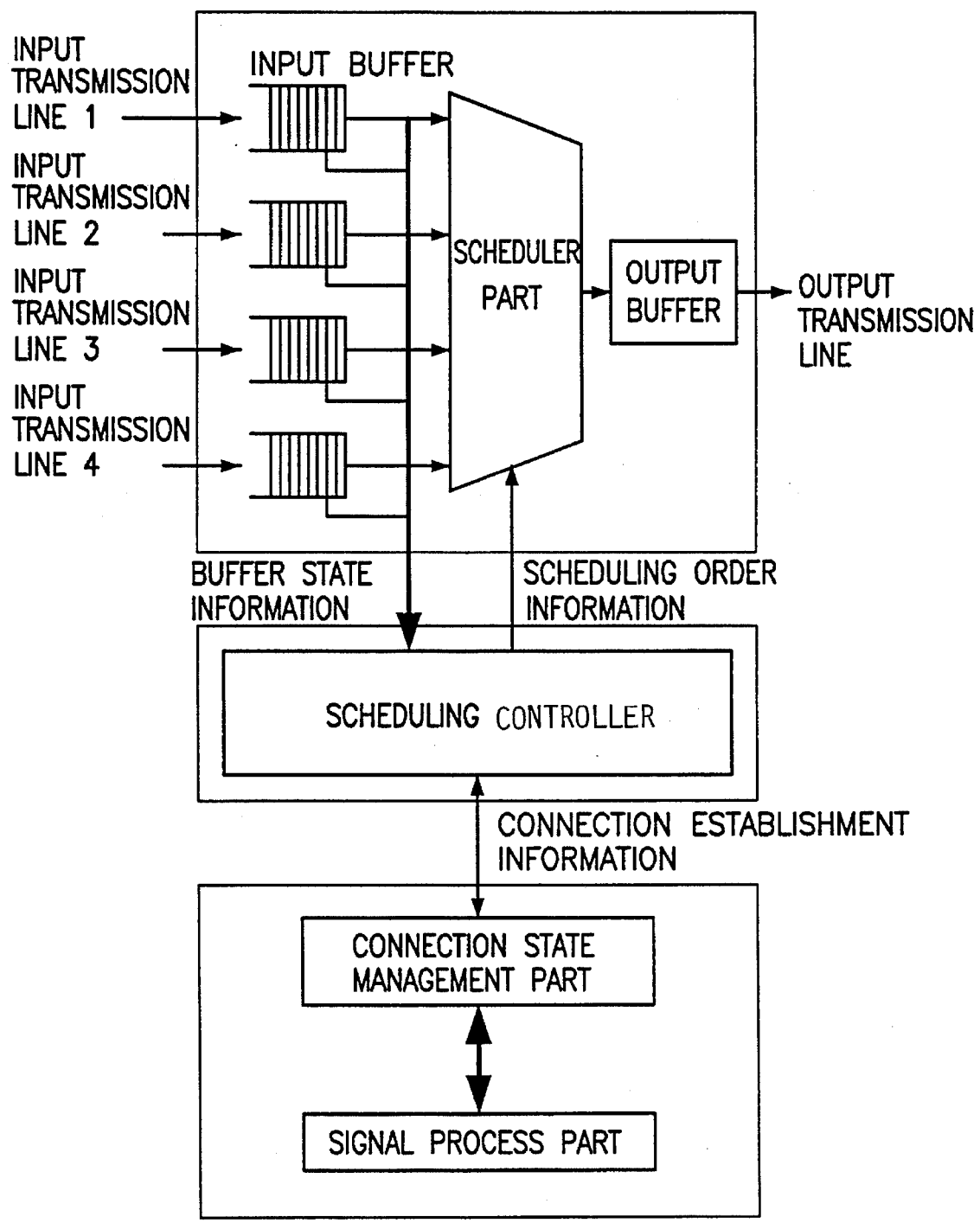
FIG. 1A and 1B is a configuration diagram of the ATM multiplexing process device in accordance with the conventional technology.
Figure 1B:
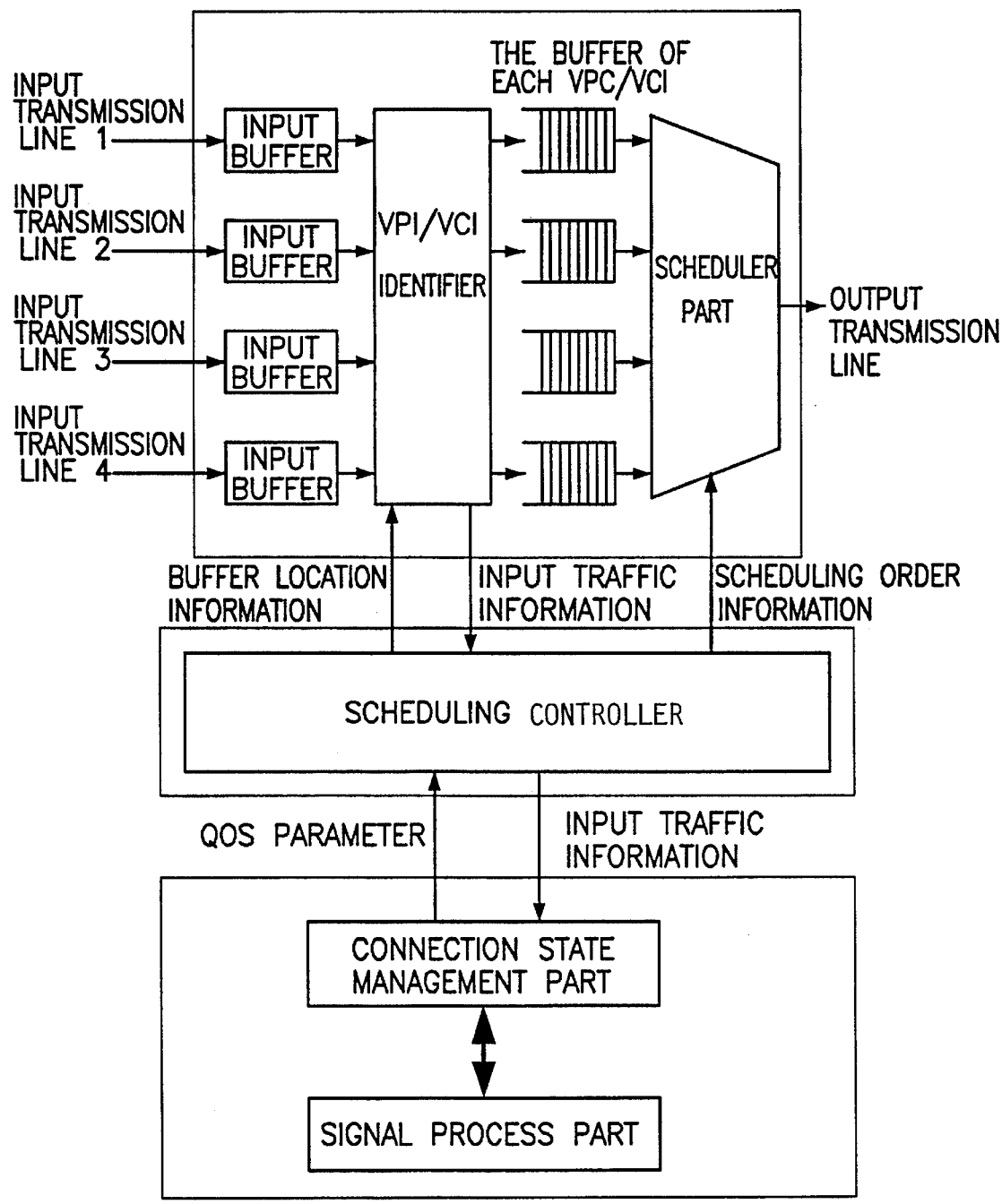
Figure 2:
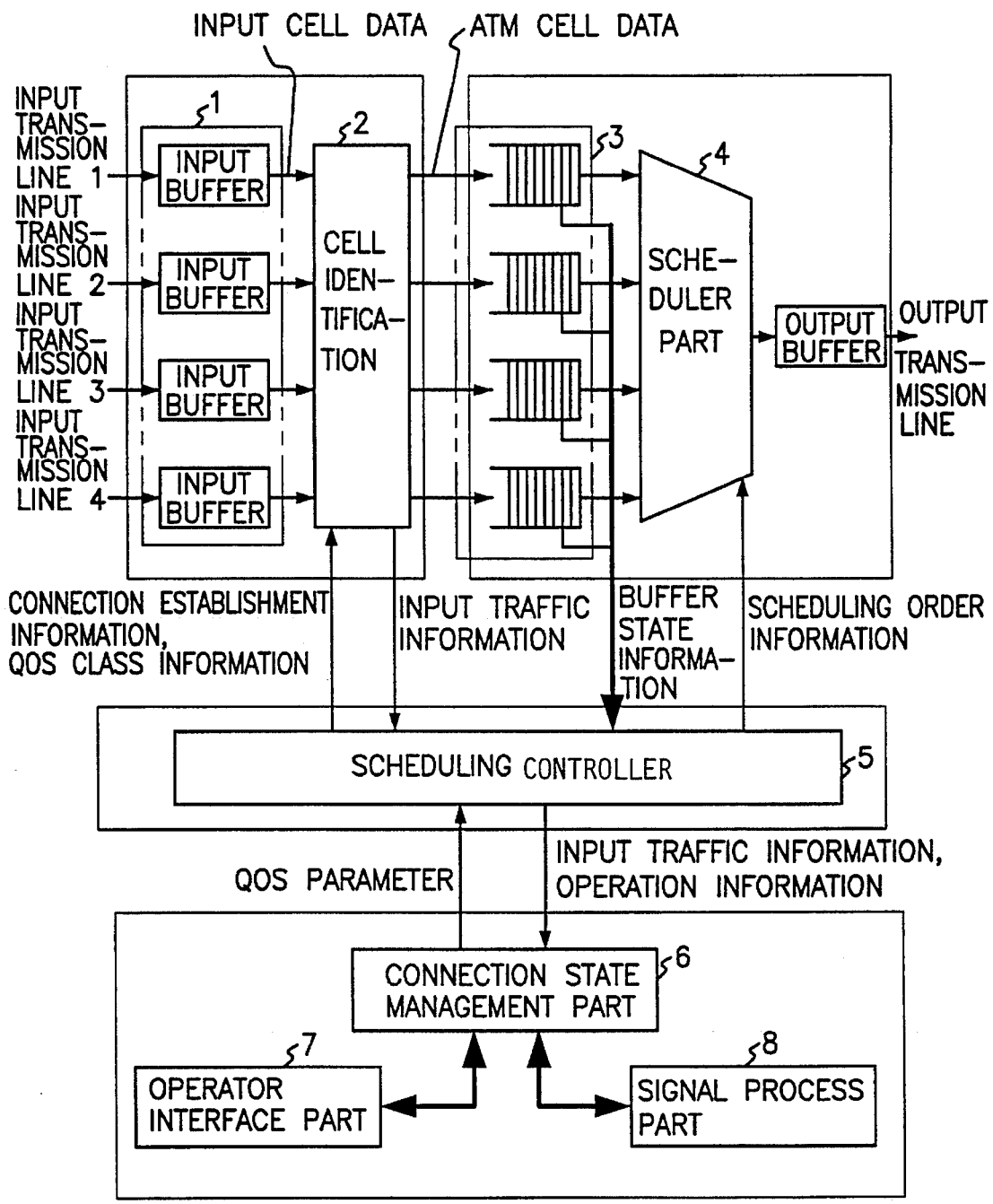
FIG. 2 is an architectural diagram of the ATM multiplexing process device in accordance with this invention.

The following is the detailed description of a embodiment of this invention by referring to FIG. 2 and after among the attached drawings:

FIG. 2 is the configuration diagram of the ATM multiplexing process device in accordance with this invention.

As illustrated in the drawing, the ATM multiplexing process device is equipped with input buffer part 1 for storing the cells inputting each input terminal through multiple input line momentarily, cell identification part 2 for outputting ATM cell data and input traffic information by classifying input cell data to a predetermined QOS class in accordance with connection establishment information, QOS class information and a header information of the input cell data after receiving input cell data from the input buffer part 1, QOS class buffer part 3 for storing ATM Cell Data classified according to the QOS class for each class and outputting buffer state information, scheduling controller 5 for outputting scheduling order information in accordance with input traffic information input from the cell identification part 2, QOS parameter input from connection state management part 6 and buffer state information input from the QOS class buffer part 3, outputting connection establishment information and QOS class information to the cell identification part 2 and outputting all the operations information of the ATM multiplexing process device and the input traffic information, scheduler part 4 outputting the cells of the QOS class buffer part 3 in accordance with scheduling order information input from the scheduling controller 5, connection state management part 6 outputting QOS parameter to the scheduling controller 5 in accordance with the added value of the network operator in order to provide the network resources efficiently and equally from the viewpoint of managing the agreed connection state information with the network and transferring all the operations of the ATM multiplexing process device and the input traffic information to operator interface part 7, and signal process part 8 interfacing with the connection state management part 6.

The following is the consideration of the operation and action effects for the above configuration:

The input buffer part in the architecture of the ATM multiplexing process device of the broadband subscriber access apparatus is a buffer used for storing the ATM cell data inputting from multiple (n) input lines respectively in the independent area per line momentarily, which is reserved until the ATM cell data are read by the QOS class buffer part independent from the cell identification part per line.

The classification of QOS classes is shown in Table 1 as follows;

| Priority | Name of Classification | Cell Delay Characteristics | Bandwidth Characteristics | Cell Loss Characteristics | Usability Characteristics | Example |
| --- | --- | --- | --- | --- | --- | --- |
| QOS1 | Real-Time Service | Sensitive to Delay of Delay | Bandwidth (BW) < 100M | Somewhat allowed | — | -continuous Video |

-continued

| Priority | Name of Classification | Cell Delay Characteristics | Bandwidth Characteristics | Cell Loss Characteristics | Usability Characteristics | Example |
|---|---|---|---|---|---|---|
|  |  | Variation $Pd < 1'$ sms $CDV < 10$ us |  | $Ploss < 10^6$ (Voice $10^{-2}$) |  | -Voice |
| QOS2 | Variable Bit Rate (VBR) Video Service | Delay rate somewhat allowed $Pd < 1'$ sms $CDV < 10$ us | Bandwidth $(BW) < 10M$ | Sensitive $Ploss < 10^{-7}$ | High Burstness | -Digital Video -Image Transfer |
| QOS3 | Variable Bit Rate (VBR) Communicating Service | Sensitive to Delay $Pd < 10'$ sms | Bandwidth $(BW) < 1M$ | Very Sensitive $Ploss < 10^{-9}$ | Burstness | -Distributed Processing -Administrative Routine |
| QOS4 | Variable Bit Rate (VBR) data service | Delay allowed $Pd < 10'$ sms | Full Range | Very Sensitive $Ploss < 10^{-9}$ | High Burstness | -Files Transfer |

In the Table 1, Pd represents the cell delay ratio and CVD represents the cell delay variation ratio respectively.

The procedure to store and read all the ATM cells progresses synchronized with the cell clock and the byte clock in the unit of a cell of 53 octet. Input buffer part 1 and QOS class buffer part 3 receive the input of the byte clock and cell identification part 2, scheduler part 4 and the output buffer receive the input of the cell clock and the byte clock. On the other hand, scheduling controller 5, connection state management part 6, operator interface part 7 and signal process part receive 8 the input of the local clock.

Figure 3A:
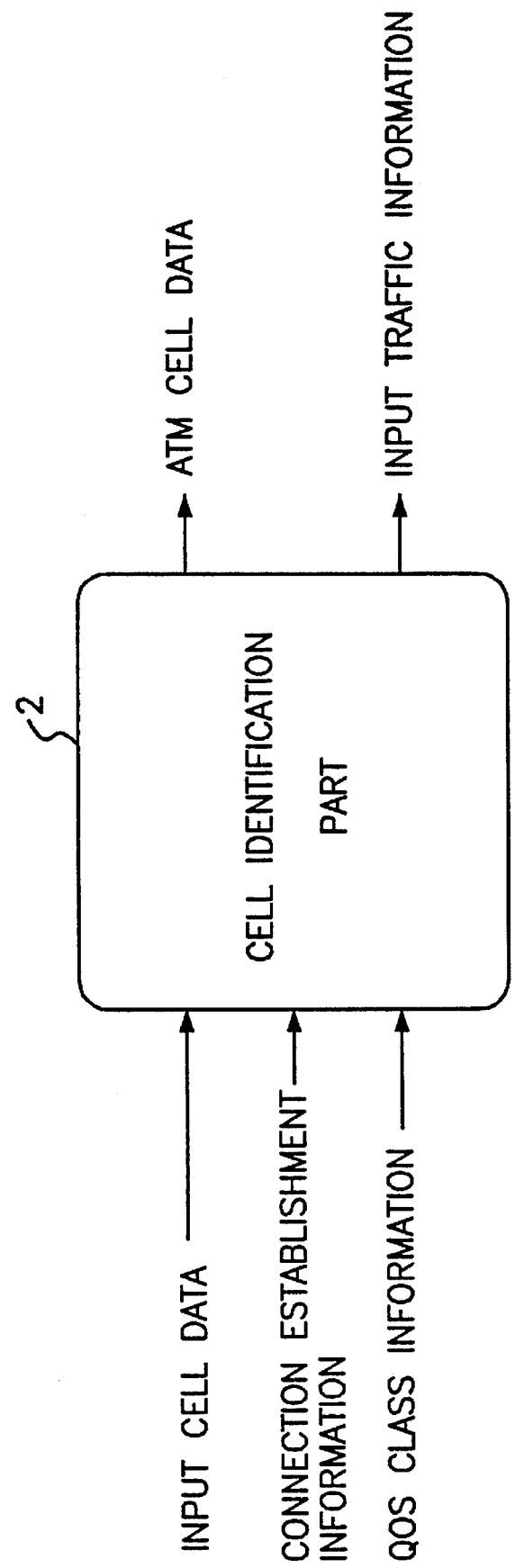

The cell identification part divides the QOS classes of the ATM cells of input buffer part 1 according to the classification in the Table 1 by using connection establishment information received from scheduling controller 5, QOS class information per a virtual connection which is established through the connection and input data from input buffer part 1 as shown in the cell identification information generating conceptional diagram of FIG. 3A, and stores ATM cell data separated per each of these classes in QOS class buffer part 3.

In accordance with the operation conceptional diagram of FIG. 3B, the QOS classes of the operations of cell identification part 2 become divided in the table lookup method using the header information of the ATM cell and the operation order is as follows:

VPI/VCI extractor 9 extracts the header information of 5 bytes out of input cell data from input buffer part 1 and separates the VPI/VCI value of the input cell comprised of 3 bytes from the header information again. Besides, class storer per VPI/VCI 11 reserves connection establishment information and QOS class information received from the scheduling controller. Subsequently, VPI/VCI comparer 10 makes VPI/VCI concurrence information per input cell by comparing the VPI/VCI field value of the input cell header output from the VPI/VCI extractor 9 and the connected and established VPI/VCI field value which is stored in the class storer per VPI/VCI 11, and the class storer per VPI/VCI 11 sends the QOS class selection signal (difference) to a cell distributer per QOS class 12 after searching the QOS class according to this information. The cell distributer per QOS class 12 stores ATM cell data output from VPI/VCI extractor 9 in the appropriate QOS class buffer part separated per class in accordance with the QOS class selection signal. These serial operations are achieved setting the synchronization with the cell clock.

The QOS class buffer Part 3 is a buffer part storing the ATM cells by separating them to a predetermined QOS class in accordance with the class classified by the cell identification part 2. The ATM cells classified into the QOS class of 4 steps according to QOS requirement like this are output in accordance with the buffer selection signal of the scheduler part 4.

The scheduling controller 5 makes a scheduling order information and transfers this to the scheduler part 4 by using state information of input traffic received from the cell identification part 2, QOS parameter which is the information indicating the state following each connection received from the connection state management part 6 and the extra value per connection of the network operator and buffer state information received from the QOS class buffer part 3.

Besides, the scheduling controller 5 makes and supplies connection establishment information for the classification of the QOS classes of the ATM cells required by the cell identification part, and transfers state information regarding all the operations of the ATM multiplexing process device and the input traffic to connection state part 6.

The scheduling part makes the buffer selection signal in accordance with the order of scheduling order information received from the scheduling controller 5 and sends, by taking advantage of this, the ATM cells of the QOS class buffer part 3 to the output line through the output buffer. All these operations are performed setting the synchronization with the cell clock and the byte clock.

The connection state management part 6 plays a role to make the QOS parameter by using the information instructing the operations following each connection from the operator interface part and signal process part and the extra value information per connection of the network operator and send this to the scheduling controller 5, and performs the capability of transferring the state information of the ATM multiplexing process device operations and the input traffic input from the scheduling controller 5 to network operator interface part 7.

Figure 4:
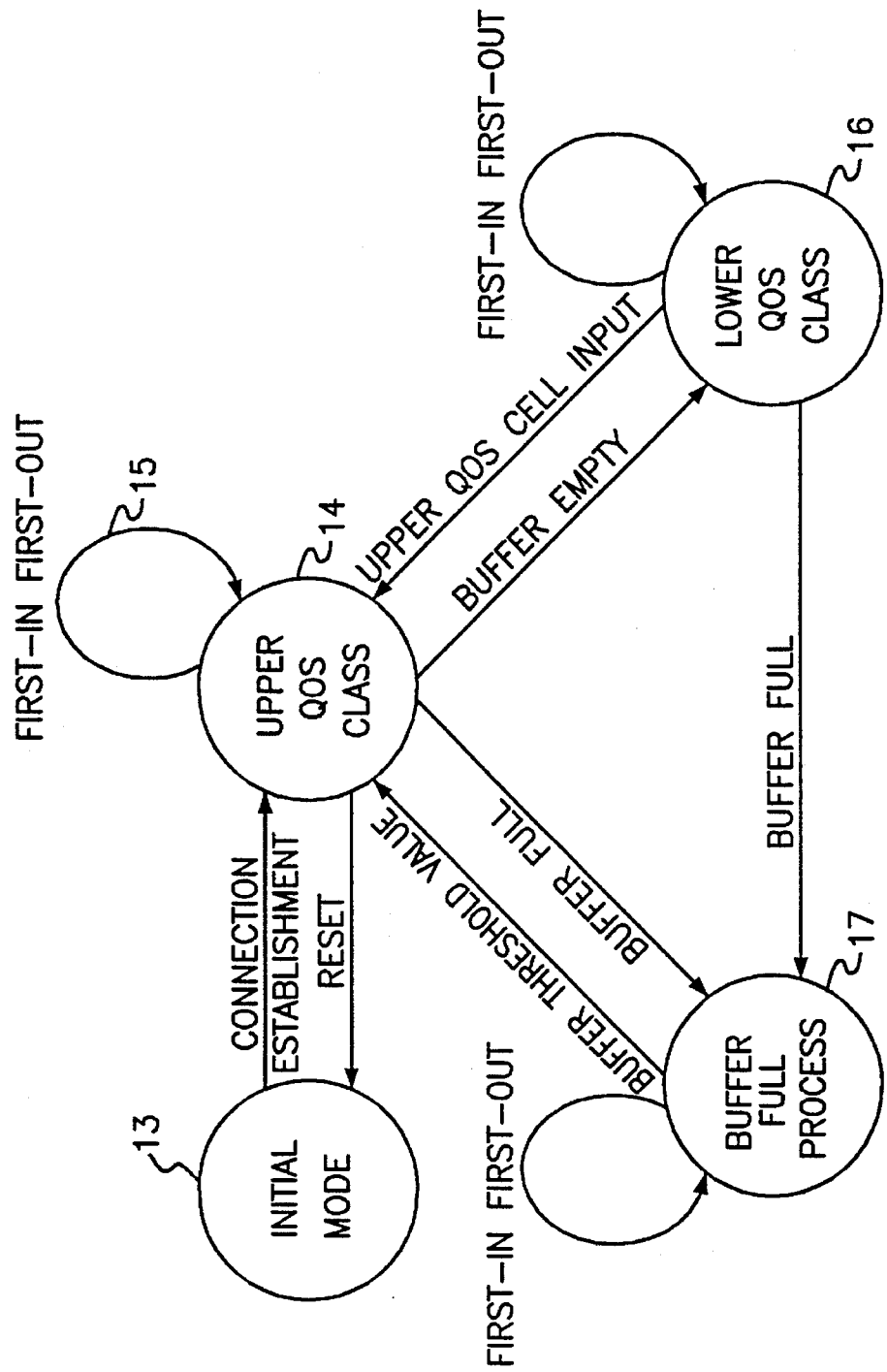
FIG. 4 is a state transition table of the scheduling control algorithm of this invention.

FIG. 4 is the state transition table to describe the operation of the scheduling algorithm according to the QOS class.

First, if the connection is established, the operation begins in an initial mode 13 and then the state of upper QOS class 14 which has the high priority.

Then, the operation continues in the same operation state according to the FIFO 15 principle until the appropriate buffer becomes empty, and if the buffer becomes empty while maintaining the state, the state changes to a lower QOS class 16.

But, if the buffer with the lower order becomes full in spite of the state with a higher priority, the operation transits to buffer full process state 17, and then returns to the original state again if the number of the served cells becomes the same as the threshold (allocating the different value per QOS class) for the resolution of 'buffer full'.

Figure 5A:
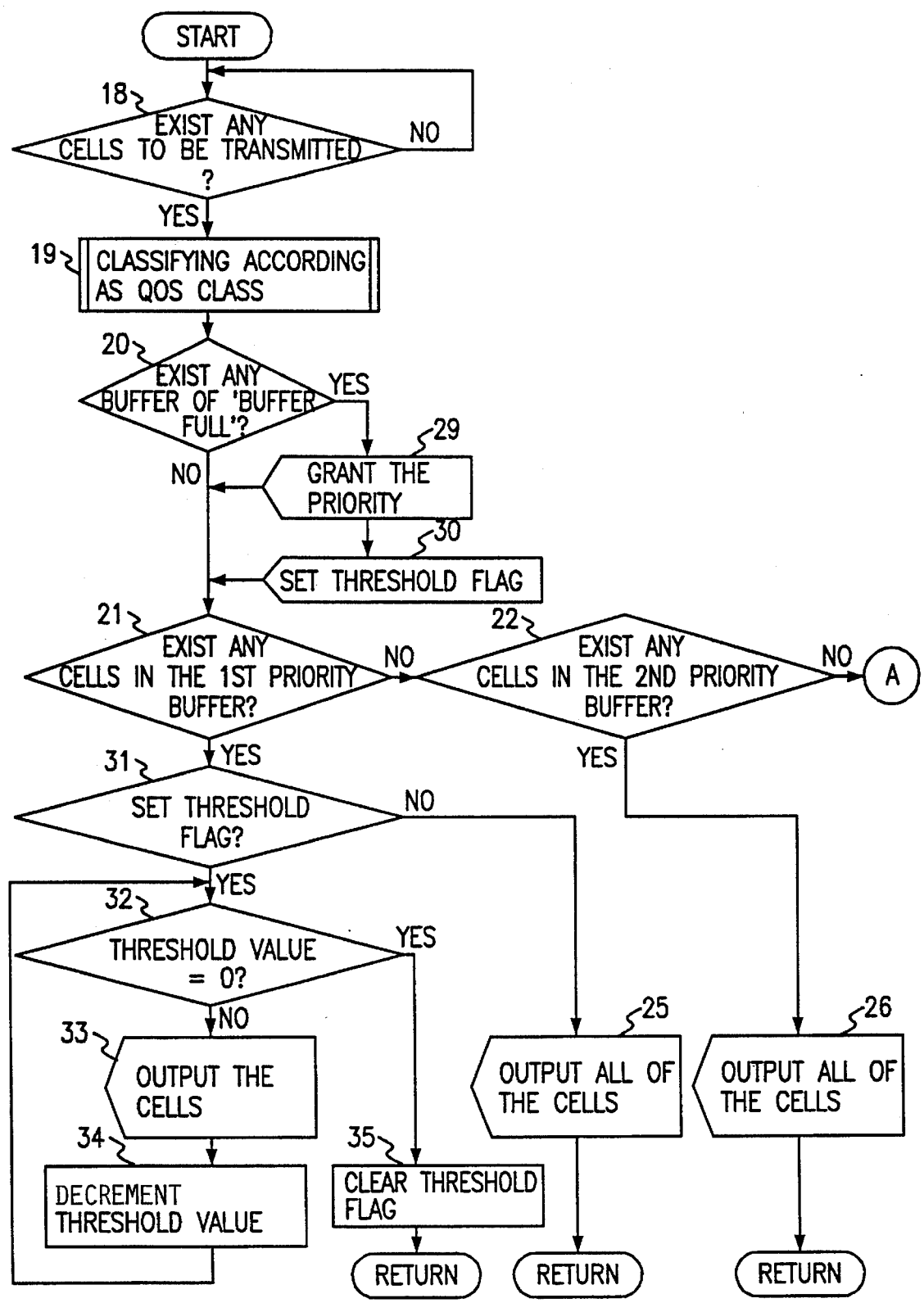
FIG. 5A and 5B is a process flow chart of the ATM multiplexing process method in accordance with this invention.
Figure 5B:
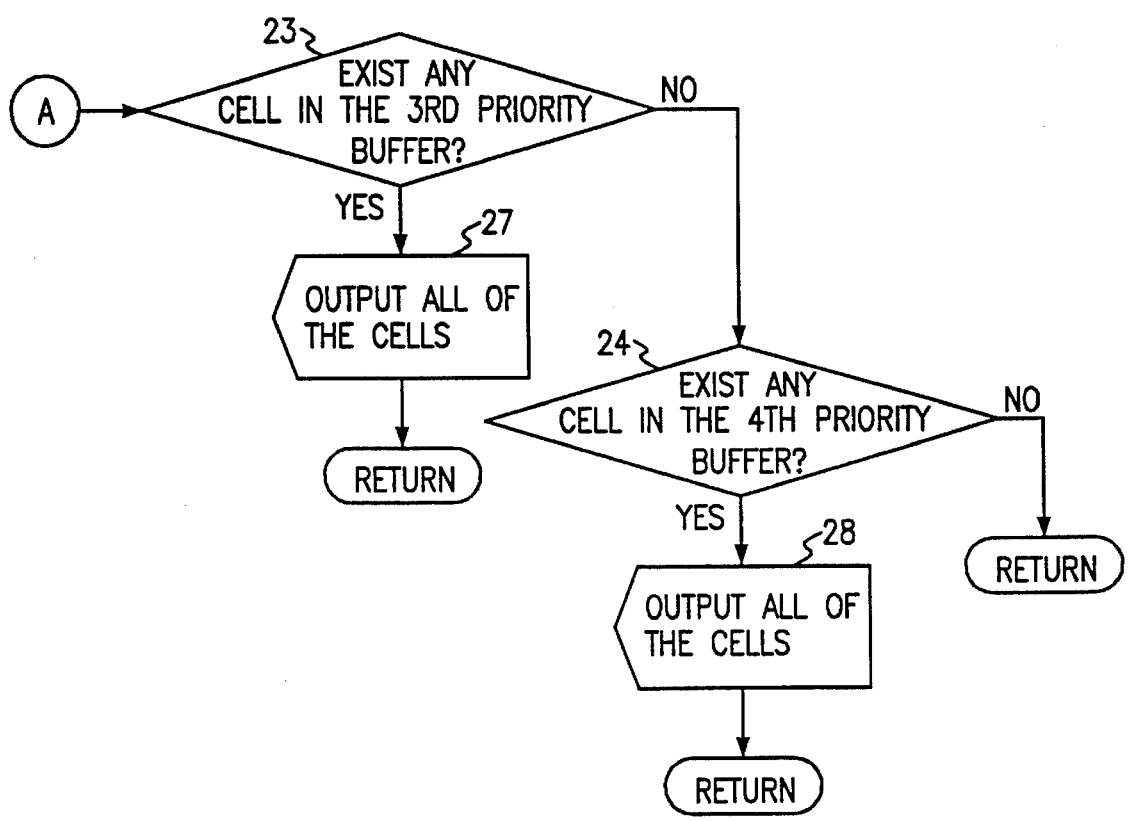

FIG. 5A and 5B is the process flow chart of the operation during the one-cell clock of the ATM multiplexing process device in accordance with the QOS class proposed by this invention, which confirms the existence of the cells to be transmitted in the preparation state 18 and stores the cells to be transmitted, if any, in QOS class buffer part 3 after classifying them according to QOS (step 19).

The ATM multiplexing, process device determines whether there is any QOS class buffer of 'buffer full' (step 20), and after making the buffer of the 1st priority by granting the priority to the QOS class buffer 3 of 'buffer full', if any, performs the step to set the threshold flag more (step 29,30); if not 'buffer full', determines whether there is any cell in the buffer of the 1st priority (step 21), confirms the existence of any cell in a buffer of the 2nd priority (step 22) if there are no cells in the buffer of the 1st priority, and outputs and returns all the cells in the buffer of the 2nd priority according to the FIFO principle if there exists any cell in the buffer of the 2nd priority (step 26); if there are no cells in the buffer of the 2nd priority, determines whether there are any cells in a next buffer of the 3rd priority (step 23), and outputs and returns all the cells in the buffer of the 3rd priority according to the FIFO principle if there exists any cells in the buffer of the 3rd priority (step 27); if there are no cells in the buffer of the 3rd priority, determines whether there are any cells in a buffer of the 4th priority (step 24), and outputs and returns all the cells in the buffer of the 4th priority according to the FIFO principle if there are any cell in the buffer of the 4th priority (step 28).

The ATM multiplexing process device determines whether the threshold flag is set if there exists any cell in the buffer of the 1st priority (step 31), and outputs and returns all the cells in the buffer of the 1st priority according to the FIFO principle if the threshold flag is not set (step 25); if the threshold flag is set, determines whether the threshold equals zero (step 32), and if not zero, outputs continuously the cells in the buffer of the 1st priority according to the FIFO principle until the threshold becomes zero (step 33,34); if the threshold becomes zero, returns the threshold flag after clearing (step 35).

This invention is a multiplexing process device according to the QOS class of the services with various characteristics and whether the buffer is full or not for the joint possession of the resources, which can be applied to the embodiment of the transmission device requiring statistic cell multiplexing according to the characteristics of the input data as well as the current telecommunications network and has an effect to be utilized for the broad band integrated service digital network requiring high speed usefully by improving cell delay characteristics for service with synchronous traffic and reducing the probability of buffer overflow.

What is claimed is;

1. An ATM multiplexing process device of a broadband integrated service digital network subscriber apparatus, comprising:

(a) input buffering means for storing cells inputting each input terminal through a plurality of input lines momentarily;

(b) cell identification means for classifying input cell data to a predetermined quality of service (QOS) class in accordance with connection establishment information, QOS class information and a header information of the input cell data after receiving the input cell data from said input buffering means, and outputting ATM cell data and input traffic information;

(c) QOS class buffering means for storing the ATM cell data input from said cell identification means, respectively, according to the class, and for outputting buffer stage information;

(d) scheduling control means for outputting the connection establishment information and QOS class information to said cell identification means, and for outputting all operation information of the ATM multiplexing process device and input traffic information, after receiving the input traffic information from said cell identification means, the buffer state information from said QOS class buffering means, and a QOS parameter;

(e) scheduling means for outputting the cells input from said QOS class buffering means to the outside in accordance with scheduling order information input from said scheduling control means; and (f) connection state management means for outputting the QOS parameter to said scheduling control means in accordance with an added value of a network operator to provide network resources efficiently and equally to manage connection state information with the network, and for transferring all the operation information of the ATM multiplexing process device and the input traffic information to the network operator after receiving them from said scheduling control means.

2. An ATM multiplexing process device of a broadband integrated service digital network subscriber access apparatus as set forth in claim 1, wherein said cell identification means comprises:

(a) VPI/VCI extraction means for outputting the ATM cell data and a VPI/VCI field value of an input cell header, after extracting a header information from input cell data input from said input buffering means and then extracting the VPI/VCI value of the input cell from the header information;

(b) VPI/VCI comparison means for outputting VPI/VCI concurrence information per input cell after comparing a VPI/VCI field value of the input cell header with the VPI/VCI field value established upon the connection establishment information;

(c) class storing means for outputting the VPI/VCI field value to said VPI/VCI comparison means after storing the connection establishment information and QOS class information received from said scheduling control means, and for outputting a QOS class selection signal after searching a QOS class in accordance with VPI/VCI concurrence information received from said VPI/VCI comparison means; and (d) cell distribution means for outputting the ATM cell data to said QOS class buffering means after separating the ATM cell data to the predetermined class in accordance with the QOS class selection signal, and for outputting the input traffic information to said scheduling control means.

3. A method for processing an ATM multiplexing of a broadband integrated service digital network subscriber access apparatus, comprising the steps of:

(a) classifying cells to be transmitted according to a QOS class and storing the cells; and determining whether there is a full QOS class buffer;

(b) outputting the cells in a buffer of the first priority according to the FIFO principle until the number of served cells becomes the same as a threshold value after making a filled buffer if any, the buffer of the first priority by granting priority to the QOS class buffer; and outputting all cells in a buffer of subsequent priority according to the FIFO principle for all buffers sequentially if there is a cell; and (c) outputting all of the cells in a predetermined buffer of the first priority according to the FIFO principle if there is no filled QOS class buffer;

outputting all cells in the QOS class buffer of the subsequent priority according to the FIFO principle sequentially; and outputting all cells for all QOS class buffers.

* * * * *